(12) United States Patent
Simpson

(10) Patent No.: US 6,399,228 B1
(45) Date of Patent: Jun. 4, 2002

(54) MULTI-LAYER INTERFERENCE COATINGS

(75) Inventor: John Simpson, Malvern (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 09/254,717
(22) PCT Filed: Mar. 26, 1998
(86) PCT No.: PCT/GB97/02492
§ 371 (c)(1),
(2), (4) Date: Mar. 12, 1999
(87) PCT Pub. No.: WO98/12583
PCT Pub. Date: Mar. 26, 1998

(30) Foreign Application Priority Data

Sep. 23, 1996 (GB) ............................................. 9619781

(51) Int. Cl.⁷ .............................. B32B 9/00; G02B 1/10
(52) U.S. Cl. ....................... 428/699; 428/428; 428/432; 428/469; 428/472; 428/696; 428/698; 359/360; 359/585; 359/588; 359/586; 359/589
(58) Field of Search ................................. 428/432, 428, 428/469, 472, 696, 701, 702, 446, 448, 402, 403, 698; 359/360, 585, 588, 586, 589

(56) References Cited

U.S. PATENT DOCUMENTS

| 4,320,155 A | | 3/1982 | Gillery | |
| 4,393,095 A | | 7/1983 | Greenberg | |
| 4,408,825 A | | 10/1983 | Stelmack | |
| 4,590,118 A | | 5/1986 | Yatabe | |
| 4,705,356 A | * | 11/1987 | Berning et al. | ............. 350/166 |
| 5,214,530 A | | 5/1993 | Coombs | |
| 5,437,931 A | | 8/1995 | Tsai | |
| 5,568,251 A | * | 10/1996 | Davies et al. | ................. 356/71 |
| 6,114,018 A | * | 9/2000 | Phillips et al. | |

FOREIGN PATENT DOCUMENTS

| EP | 0 080 182 | 6/1983 |
| JP | 02 149488 A | 6/1990 |

* cited by examiner

Primary Examiner—Deborah Jones
Assistant Examiner—Jennifer McNeil
(74) Attorney, Agent, or Firm—Nixon & Vanderhye P.C.

(57) ABSTRACT

A multi layer interference coating comprising at least one multi layer stack deposited on a reflective layer (9), wherein each multi layer stack comprises a first dielectric layer (11), a layer of asbsorbing material (10) and a second layer of dielectric material (11) arranged in series and having a reflectance spectrum in the infrared region comprising at least one maximum. The dielectric layers are of equal optical thickness and typically are of the same material. The multi layer structure of the coating is such that incident electromagnetic radition, for which odd multiples of half wavelengths correspond to the optical thickness of the multi layer coating at the incident wavelength do not propagate within the coating and reflection at these wavelengths, is suppressed. Coatings may therefore be designed to have a near satured color in the visible wavelength spectrum. The reflective layer may be a metal or a conducting oxide, a conducting nitride, a conducting silicide or a conducting sulphide. The absorbing layers may be Cr, V, Pd, Ni, Pt, conducting oxides, or substoichiometric metal oxides, such as $TiO_x$. In one form of the coating, where a non-metal absorber is used, the second dielectric layer may be removed in at least one of the multi layer stacks. The coating may be incorporated in a system for verifying the authenticity of an article.

44 Claims, 12 Drawing Sheets

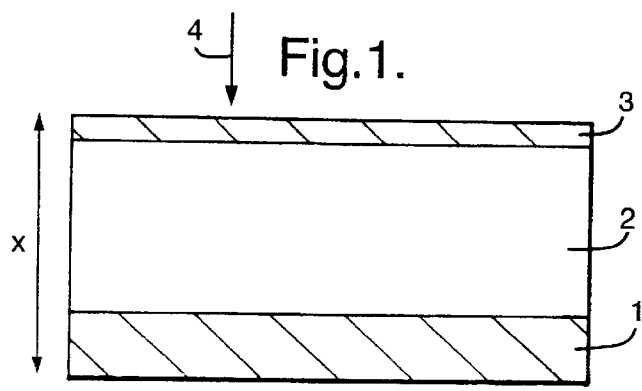
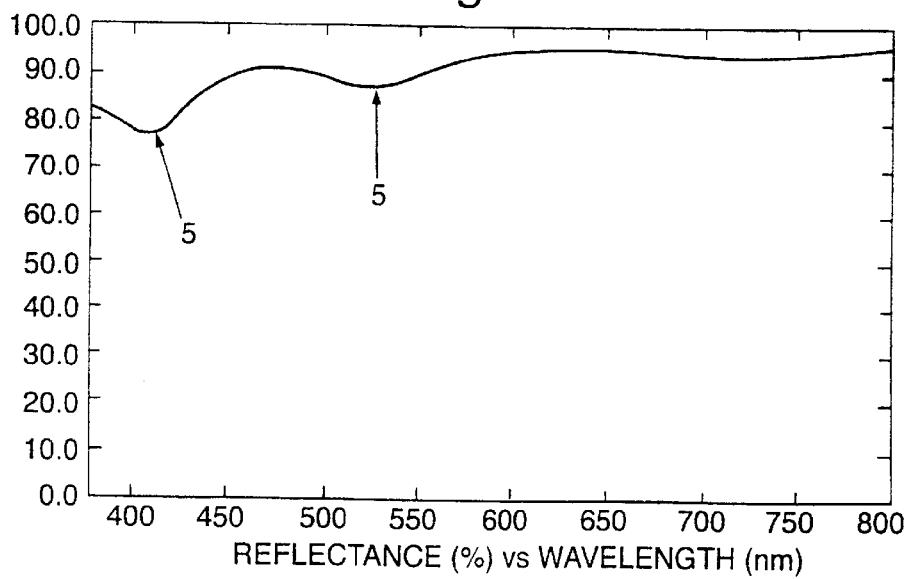

MULTI-LAYER INTERFERENCE COATINGS

BACKGROUND OF THE INVENTION

1. Field of the Invention

The invention relates to multi layer coatings which use interference effects rather than absorptive dyes to modulate spectral reflectances. The coatings may be in the form of a thin film or a pigment and may be applied to products or articles for anticounterfeiting purposes in order to identify genuine goods. The coatings may also be used for spectral control of thermal emittance or for thermal control purposes.

2. Discussion of Prior Art

The use of pigments which use interference effects to provide colour is becoming increasingly popular in many areas. Absorptive colour pigments are often based on toxic heavy metals which can be problematic. Interference colours have the further advantage that they may be angle tuned to provide additional decorative effects. Furthermore, once the material system has been qualified, new colours may be produced without the need for extensive weathering trials.

Optically variable pigments (OVPs) based on interference effects and having a metal-dielectric-metal layer structure (M'-D-M) are known in the prior art (U.S. Pat. No. 4,705,356). The structure comprises a reflective metal layer (M') a dielectric layer (D) and a thin absorbing metal layer (M), which forms a Fabry Perot cavity. The OVP has a large colour shift with viewing angle which makes it difficult for counterfeiters to reproduce by other means. Structures based on multiple periods of dielectric spacer-metal absorber layer pairs and constructed on reflective metal layers (e.g. M'(D)$^n$) are also known (U.S. Pat. No. 5,214,530). The structures are peak suppressing (i.e. reflection minima are suppressed) for the purposes of producing stronger chromatic effects.

Relevant background to the present invention can also be found in U.S. Pat. No. 5,437,931 which relates to optically variable multi layer films providing reflection characteristics in the visible wavelength region.

SUMMARY OF THE INVENTION

The present invention specifically relates to multi layer interference coatings which have strong reflectance characteristics in the infrared wavelength region. The structures are peak suppressing but have the advantage over known multi layer structures that they comprise fewer layers making fabrication more straightforward. Furthermore, in one form of the invention, fabrication is not only easier in this respect but also because of the particular materials used.

There are a number of applications for coatings exhibiting strong reflectance characteristics in the infrared wavelength region. In particular, for covert marking and anticounterfeiting applications, hidden spectral features may be used to uniquely identify an article or product. Conventional multi layer interference structures, however, do not operate well in the infrared wavelength region. The coatings may be constructed such that they have strong reflectance characteristics in the infrared.

The invention also relates to an anticounterfeiting or product tracking system in which the multi layer coatings may be incorporated, the operation of which may be covert.

According to the present invention, a multi layer interference coating, having a reflectance spectrum in the infrared wavelength region comprising at least one maximum, comprises;

a reflective layer having at least one surface for carrying one or more multi layer stacks, wherein each multi layer stack comprises a first layer of dielectric material, a layer of absorbing material and a second layer of dielectric material arranged in series with the layer of absorbing material situated between the first and second layers of dielectric material, wherein the second layer of dielectric material has substantially the same optical thickness as the first layer of dielectric material at a wavelength substantially corresponding to a maximum in the reflectance spectrum and wherein the layer of absorbing material has a refractive index n and an optical constant k, such that incident electromagnetic radiation, having a wavelength at which odd multiples of half wavelengths substantially correspond to the optical thickness of the coating at said wavelength, is substantially absorbed within the coating.

Preferably, the first dielectric material is the same as the second dielectric material. At least one of the first or second dielectric materials may be any one of titanium oxide ($TiO_2$), magnesium fluoride ($MgF_2$), zinc sulphide (ZnS), zinc selenide (ZnSe), silicon (Si), germanium (Ge) or barium fluoride ($BaF_2$)

In a preferred embodiment, the n/k ratio of the absorbing material is between 0.7 and 1.3, and is preferably substantially equal to 1, in the infrared wavelength region.

The reflective layer may be a metal, for example, gold, silver or aluminium. The absorbing material may be a metal, for example, chrome (Cr), vanadium (V), palladium (Pd), nickel (Ni) or platinum (Pt).

In another embodiment of the invention, the absorbing material may be a substoichiometric metal oxide. Preferably, the substoichiometric metal oxide may be of the same material as the layer of dielectric material. For example, the substoichiometric metal oxide may be titanium oxide ($TiO_x$) and the dielectric material may be titanium dioxide ($TiO_2$).

In another form of the invention, the absorbing material may be a conducting oxide, a conducting nitride or a conducting silicide, for which the n/k ratio is substantially equal to 1 in the infrared wavelength region. For example, the absorbing material may be indium tin oxide (ITO), doped tin oxide, for example $SnO_2$:F, or titanium nitrate, (TiN). Alternatively, the absorbing material may be vanadium dioxide ($VO_2$) substoichiometric vanadium oxide ($VO_{2-x}$) or doped $VO_2$ and the reflectance spectrum of the coating may be varied with temperature.

If a conducting oxide, nitride, silicide or sulphide is used as the absorbing material, it may be advantageous to use a like conducting oxide, nitride or silicide as the reflective substrate. Alternatively, the reflective layer may be a metal, such as gold, silver or aluminium.

The reflective layer may have two opposite facing surfaces wherein at least one multi layer stack is deposited on each of the two opposite facing surfaces such that the coating has a substantially symmetric structure about the reflective layer.

The reflective layer may comprise a reflective material deposited on a non-reflecting particulate substrate or may be a reflecting particulate substrate.

The coating may be in the form of a thin film which may be flaked into fragments and incorporated into a paint or ink. Alternatively, the reflective layer may be substantially spherical, with at least one multi layer stack is deposited on the substantially spherical reflective layer. The substantially spherical multi layer structure may then be incorporated into a paint or ink.

The coating may be applied directly to the surface of an article or applied to a label to be applied to an article. Alternatively, the coating may be incorporated into a moulded article.

In another embodiment of the invention, where the absorbing material is a non-metal material, the second layer of dielectric material may be absent in at least one of the multi layer stacks, such that incident electromagnetic radiation, having a wavelength at which odd multiples of quarter wavelengths substantially correspond to the optical thickness of the coating at said wavelength, is substantially absorbed within the coating.

In this form, the absorbing material may be a conducting oxide, nitride, silicide or sulphide, for example ITO, doped tin oxide (for example $SnO_2$:F), TiN, $VO_2$, substoichiometric $VO_2$ ($VO_{2-x}$) or doped $VO_2$. Alternatively, the absorbing material may be a substoichiometric metal oxide, for example $TiO_x$.

According to another aspect of the invention, a system for marking an article and checking its authenticity comprises;

a multi layer interference coating, having a reflectance spectrum comprising at least one maximum, wherein the coating is applied to the article to be authenticated, means for illuminating the coating with incident radiation comprising one or more wavelengths wherein one or more of the wavelengths substantially correspond to a maximum or a minimum in the reflectance spectrum of the coating and means for detecting radiation reflected from the coating at substantially one or more of the wavelengths, whereby the detection of the reflected radiation provides an indication of the authenticity of the article.

A comparison of the reflected radiation at two or more wavelengths may provide an indication of the authenticity of the article.

According to another aspect of the invention, a system for covertly marking an article and checking its authenticity comprises;

a multi layer interference coating having a temperature dependent reflectance spectrum, wherein the coating is applied to the article to be authenticated, means for varying the temperature of the coating such that the reflectance of the coating at one or more wavelengths may be varied as the temperature is varied, means for illuminating the coating with infrared radiation comprising one or more wavelengths substantially corresponding to one or more of the wavelengths at which the reflectance varies and means for detecting infrared radiation reflected from the coating at one or more of the wavelengths at which the reflectance varies, whereby a comparison of the reflected radiation before and after the temperature of the coating is varied provides an indication of the authenticity of the article.

A single laser may be used to both illuminate and vary the temperature of the coating. A thermal imager or a spectrophotometer may be used to detect the reflected radiation.

BRIEF DESCRIPTION OF THE DRAWINGS

The invention will now be described, by example only, with reference to the following figures in which;

FIG. 1 shows a diagram of the conventional metal-dielectric-metal (M'-D-M) structure of an optically variable pigment, FIG. 2 shows the reflectance spectrum of a single layer of dielectric on a silver reflector.

DETAILED DESCRIPTION OF PREFERRED EMBODIMENTS

Referring to FIG. 1, a conventional metal-dielectric-metal (M'-D-M) structure comprises a metal reflector substrate 1, such as silver, a dielectric layer 2 and a top layer of metal absorber 3.

Figure 3:
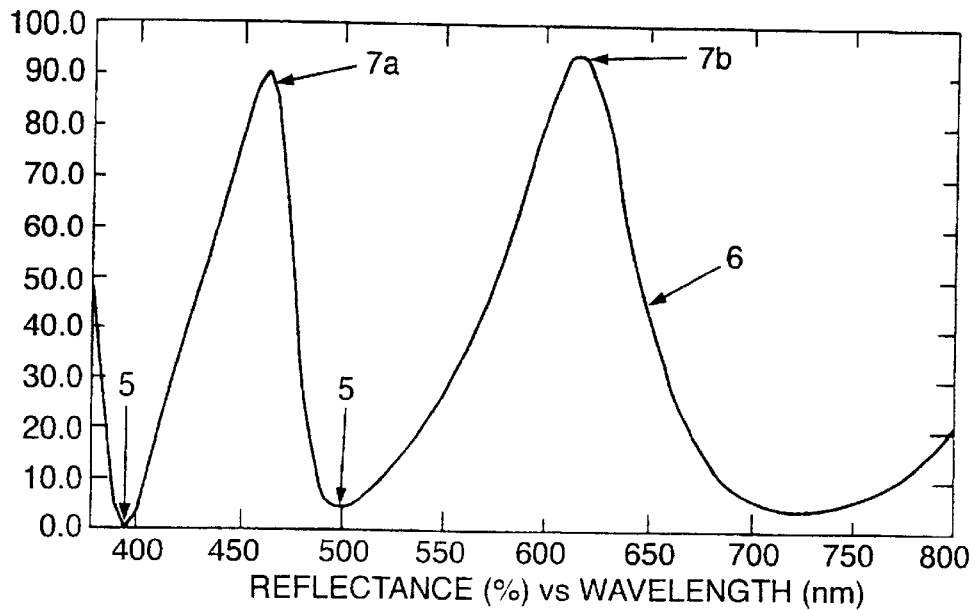
FIG. 3 shows the reflectance spectrum of the M'-D-M structure shown in FIG. 1.

The reflectance spectrum of a dielectric layer (for example magnesium fluoride, $MgF_2$) deposited on a metal reflector substrate is shown in FIG. 2 and FIG. 3 shows the reflectance spectrum of the M'-D-M structure illustrated in FIG. 1 (i.e. including the metal top absorber layer 3).

The thin metal absorber layer 3 forms a Fabry Perot cavity and the metal/dielectric structure 2,3 acts as an induced absorber as nodes in an incident propagating electric field 4 that intersect with the surface are absorbed. This occurs when odd multiples of quarter-waves of the electric field, corresponding to minima in the reflectance curve 6, propagate within the cavity. The minima 5 in the reflectance curve 6 are therefore pulled down.

Even multiples of quarter-waves of the electric field (i.e. whole half-waves) with antinodes at the surface are not affected and so there is an enhanced contrast between reflection minima 4 and reflection maxima 7, compared to the reflectance spectrum of a simple metal-dielectric structure (FIG. 2). The visual result is that stronger reflection colours are seen by a human observer.

Figure 4:
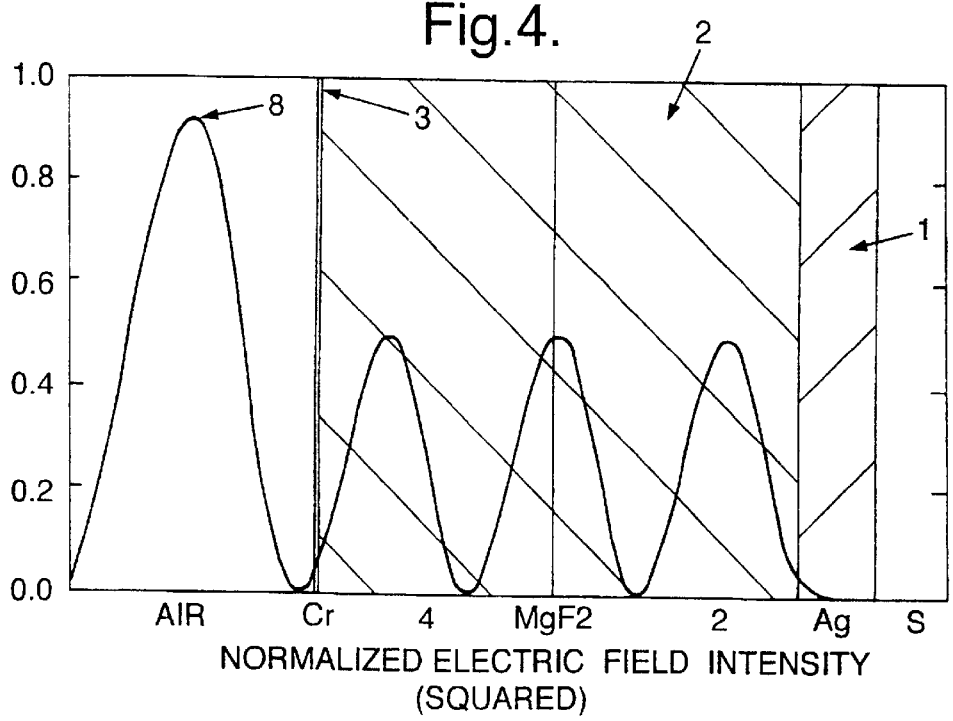
FIG. 4 shows the electric field intensity propagating within the M'-D-M structure shown in FIG. 1.

FIG. 4 shows the electric field intensity 8 propagating within the M'-D-M structure at a wavelength of 625 nm, corresponding to an odd multiple of half waves and a maximum 7b in the reflection curve 6 (see FIG. 3). Odd multiples of half-waves (as shown in the figure) and even multiples of half-waves can therefore propagate in the structure. The metal and dielectric regions 1,2,3 are indicated on the intensity spectrum.

Figure 5A:
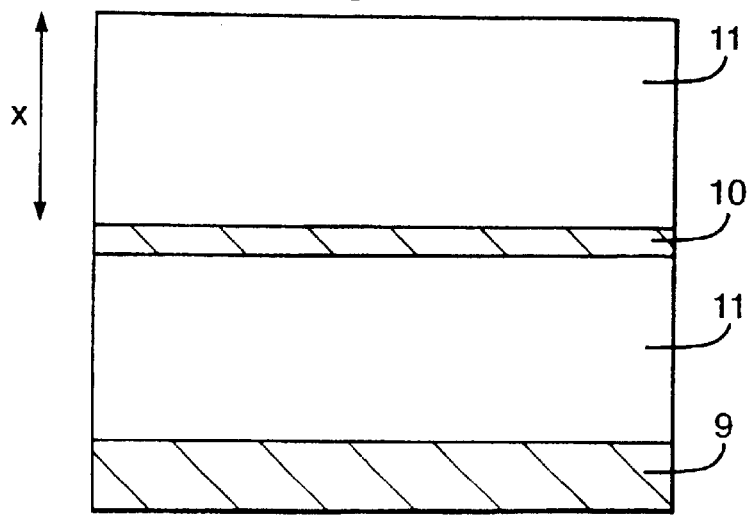
FIG. 5a shows an asymmetric reflector-dielectric-absorber-dielectric structure (R-D-A-D)

FIG. 5 shows a reflector-dielectric-absorber-dielectric structure (R-D-A-D). The structure comprises a reflective metal layer 9 and a thin absorbing layer 10 contained within a dielectric layer 11, such that there is a substantially equal optical thickness of dielectric 11 either side of the absorbing layer 10. For example, the reflective layer may be silver, the dielectric layer may be $MgF_2$ or $TiO_2$, and the absorber layer may be a metal such as Cr, V, Pd or Pt. The characteristics of suitable 'grey' metals which may be used as the absorber layer are described in U.S. Pat. No. 4 705 356.

Figure 6:
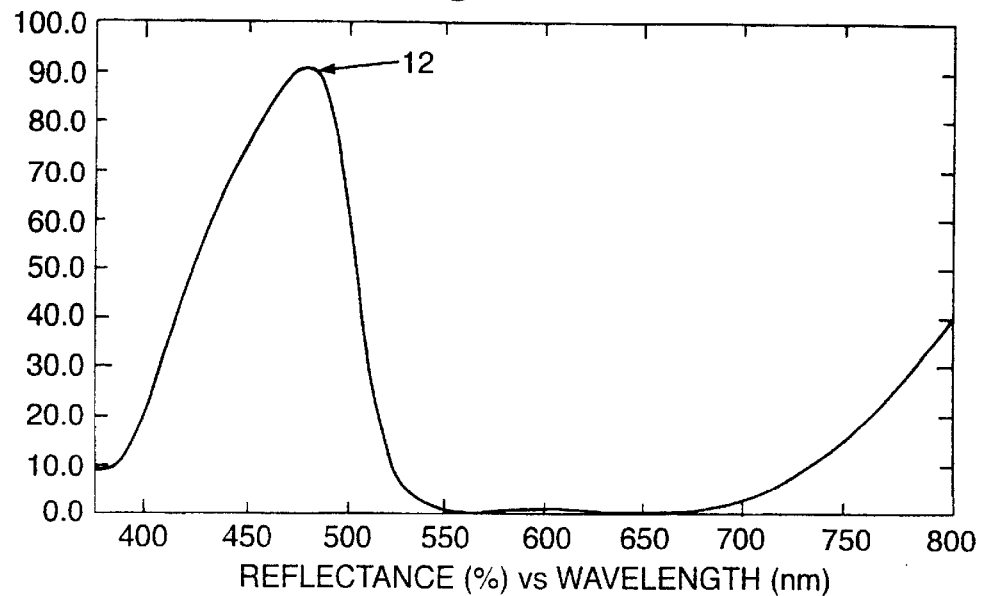
FIG. 6 shows the reflectance spectrum of an R-D-A-D structure.

The reflectance spectrum of an R-D-A-D structure is shown in FIG. 6. The presence of the absorbing layer 10 in the middle of the dielectric layer 11 has the effect of enhancing the contrast in the reflection spectrum. In this example, the reflective layer 9 is silver and has a thickness of 50 mm, although this may be any thickness sufficient to ensure opacity. The dielectric material 11 in each layer is $MgF_2$, with each layer having a thickness of 320 nm and the absorber layer 10 is Cr and has a thickness of 6 nm. Comparing with FIGS. 2 and 3, the transmission maximum 7b centred at approximately 620 nm has been suppressed leaving, in this example, only one discrete reflection maximum 12 occurring in the visible wavelength region. In the case of a metal absorber, such as Cr, the thickness for maximum contrast in the reflectance spectrum is typically, although not exclusively, between 6 and 15 nm depending on the particular metal used and the refractive index of the dielectric material.

The thickness of the dielectric layer determines the position at which reflection minima and maxima occur in the reflectance spectrum. Typically, the dielectric layer may have a thickness, x, of between 10 nm and 800 nm, although eventually, any effects visible to the human eye are lost with increasing thickness as the number of reflectance maxima and minim in the visible region increases. However, applications such as covert product marking may make use of complex reflectance profiles that the human eye cannot identify.

Figure 7:
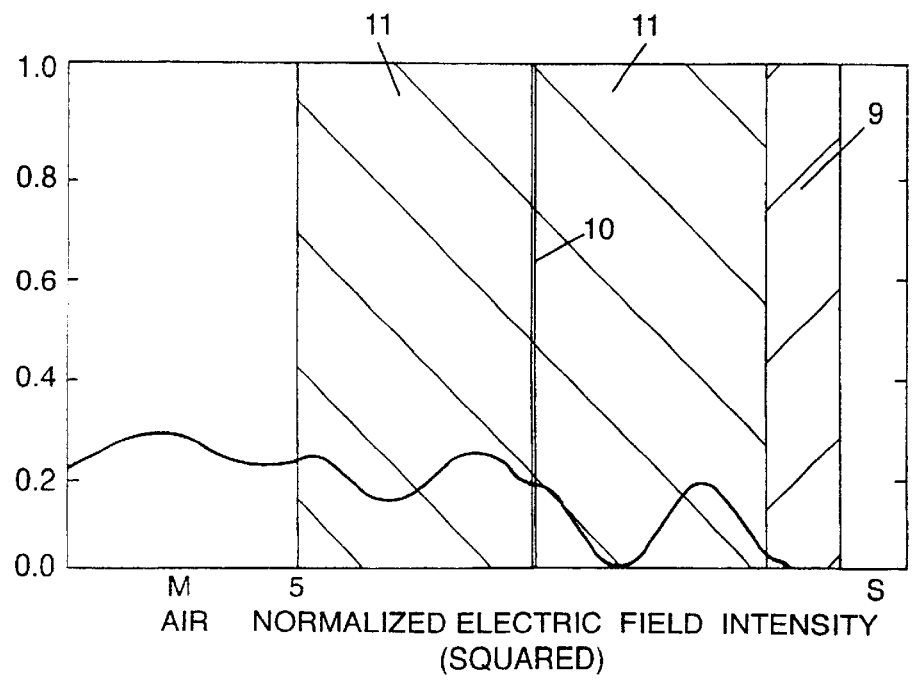
FIG. 7 shows the electric field intensity in the R-D-A-D structure of FIG. 6 for an odd multiple of half-waves corresponding to the maximum in the reflection spectrum.

FIG. 7 shows the electric field intensity in the R-D-A-D structure for an odd multiple of half waves corresponding to the reflection maximum 12 (as shown in FIG. 6). By placing an absorber layer 10 at the midpoint of the dielectric 11, odd multiples of half-waves corresponding to the reflection maximum 12 are suppressed. In the absence of the metal absorbing layer 10, the electric field would propagate as shown in FIG. 4, but induced absorption in the metal 10 suppresses propagation of the mode.

Figure 8:
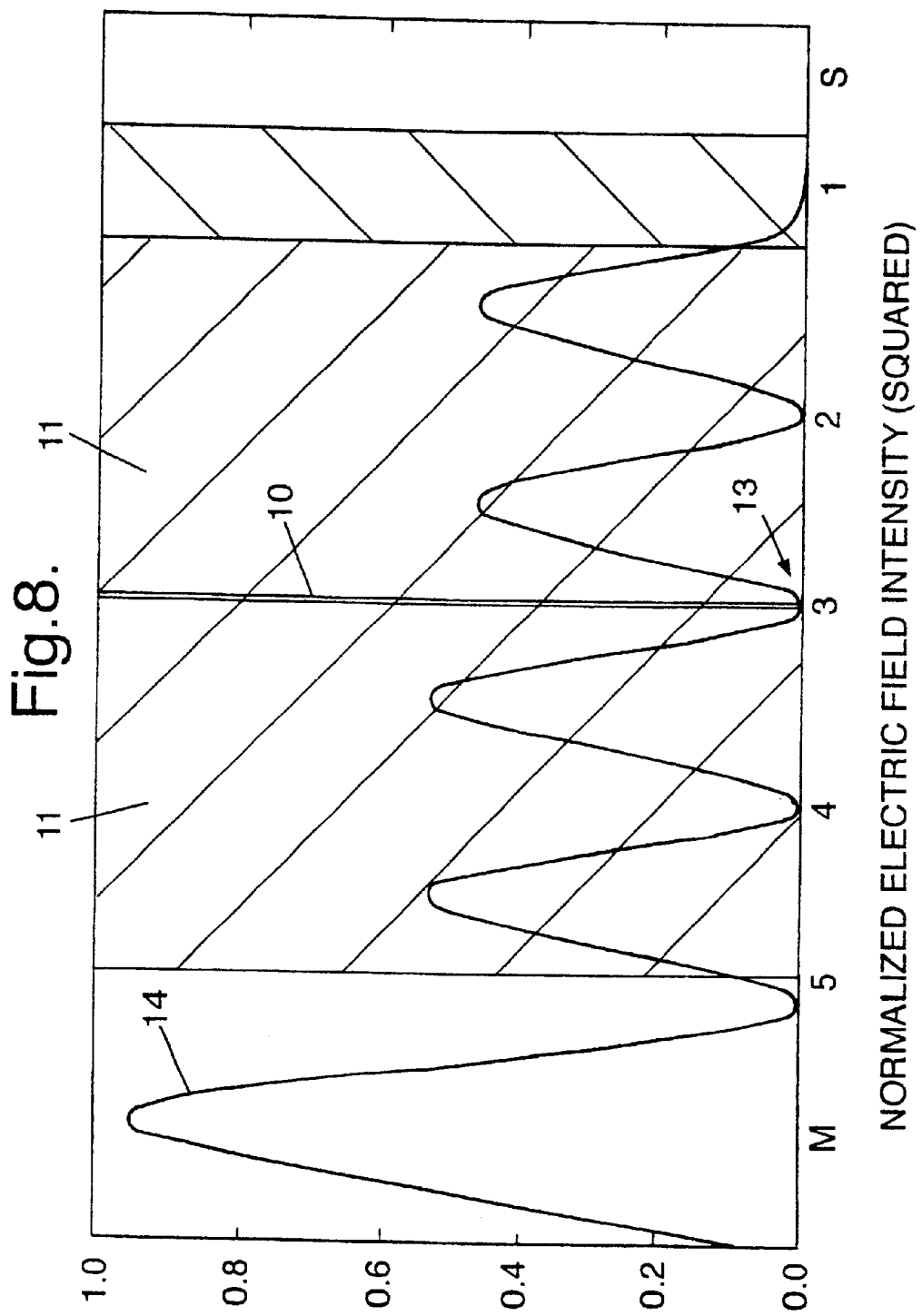
FIG. 8 shows the electric field intensity in the R-D-A-D structure of FIG. 6 for an even multiple of half-waves corresponding to the maximum in the reflection spectrum.

FIG. 8 shows the electric field intensity in the R-D-A-D structure for an even multiple of half waves corresponding to the reflection maximum 12. An antinode 13 in the propagating electric field 14 is coincident with the absorber layer and propagation is therefore allowed. The result is therefore the suppression of propagating light modes within the structure which are odd multiples of half waves.

Referring to FIG. 7, the effect of losing every other reflectance peak in the reflectance spectrum is to greatly enhance the chromaticity of the structure. The peaks that remain in the reflectance spectrum are widely separated and so the purity of colour of each reflectance peak is not diluted by the immediately adjacent peaks.

Figure 9:
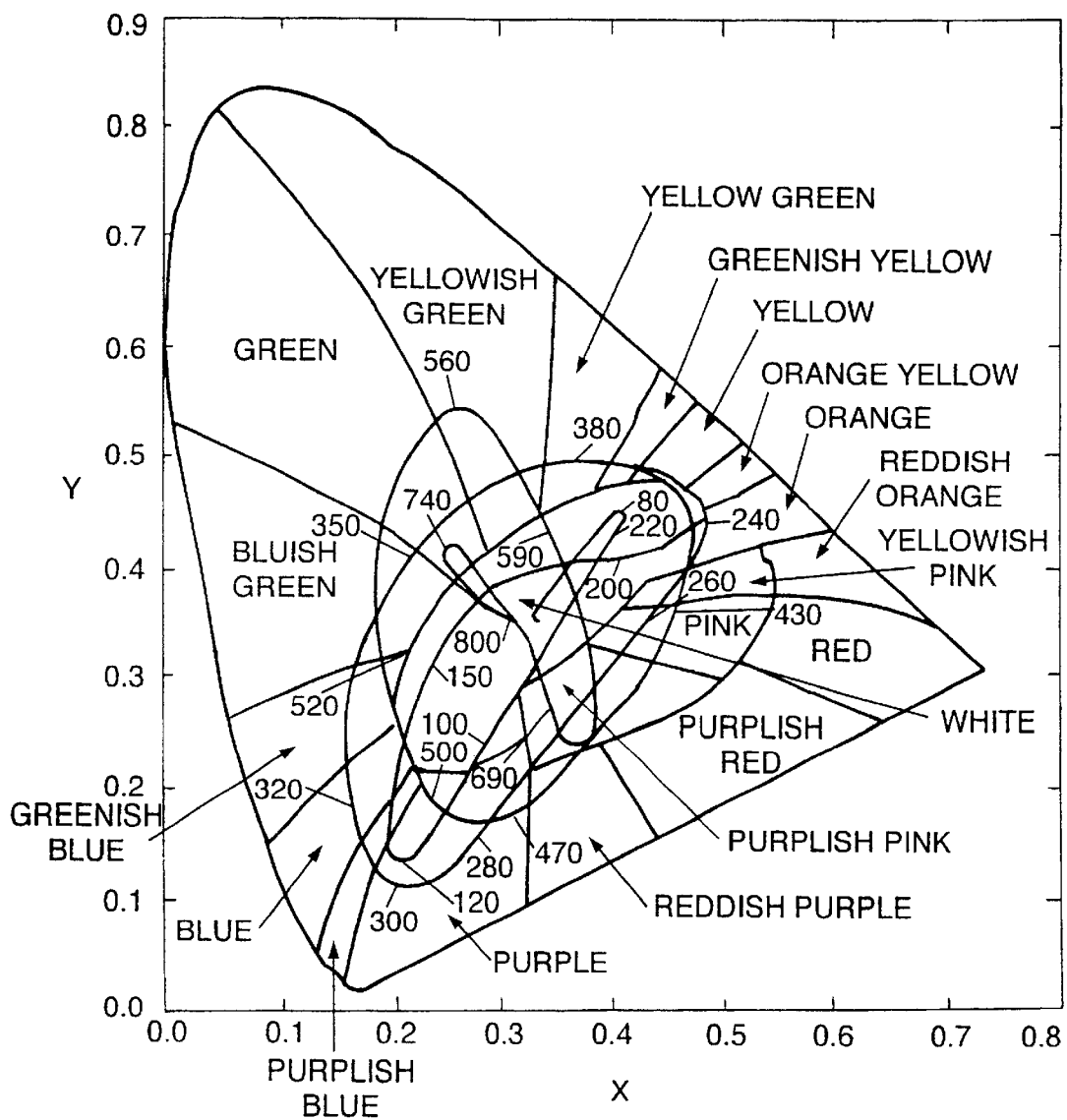
FIGS. 9 and 10 show the colour trajectories for M'-D-M and R-D-A-D structures respectively, overlaid on a 1931 CIE chromaticity diagram.
Figure 10:
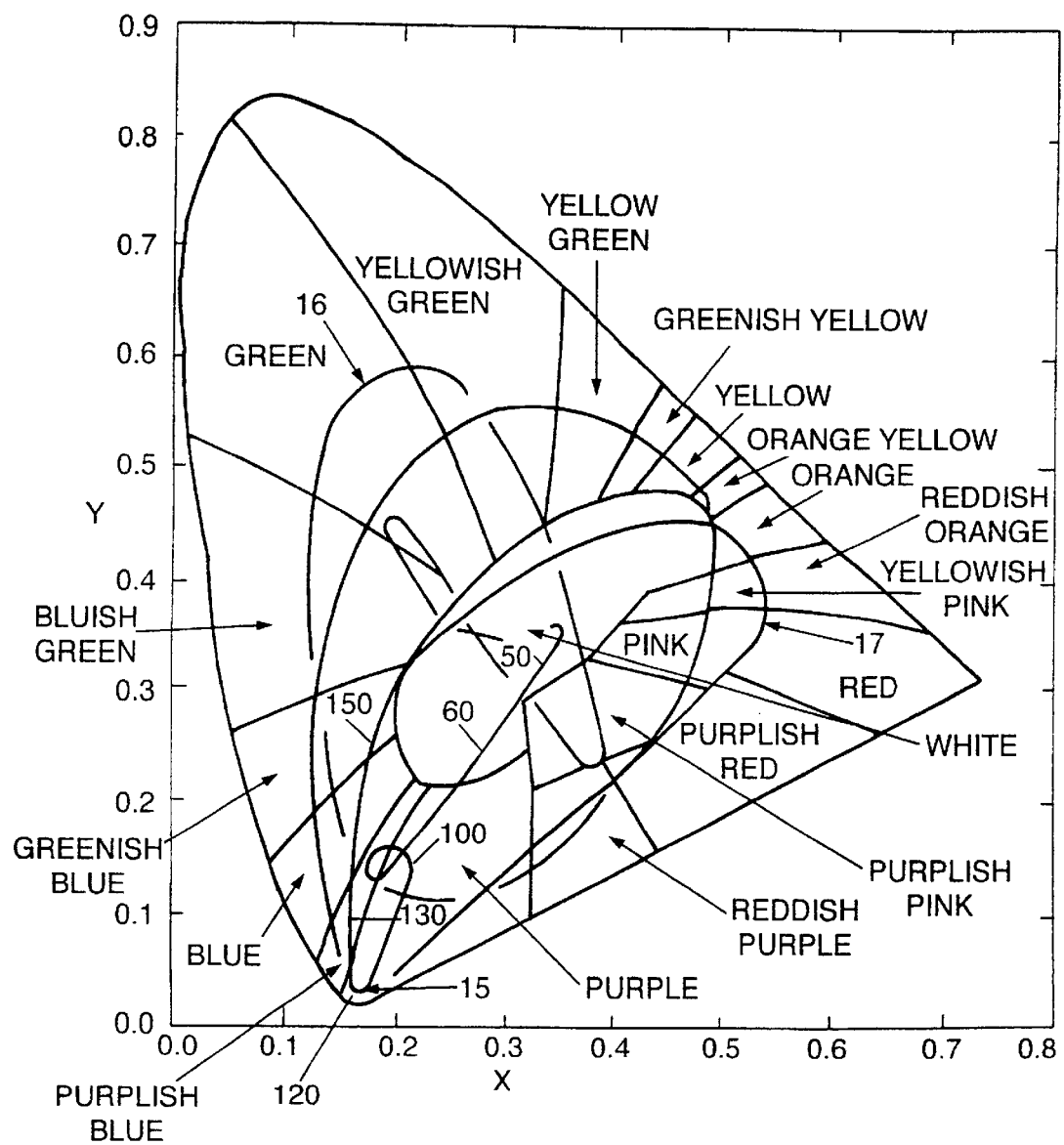

The enhanced chromaticity of the R-D-A-D structure is illustrated by comparing FIGS. 9 and 10 which show colour trajectories for the M'-D-M structure and the R-D-A-D structure respectively. The colour trajectories are realised by increasing the thickness of the dielectric layers from 10 nm to 800 nm and overlaid on 1931 CIE chromaticity diagram.

It can be seen from the chromaticity diagram that, for the R-D-A-D structure, the colour space available is almost fully saturated in the blue/purple colour region (15, FIG. 10). The green region available in the R-D-A-D structure is also more extensive (16, FIG. 10), as is the available red region (17, FIG. 10).

U.S. Pat. No. 5,214,530 refers to a structure that gives peak suppression for enhanced chromaticity effects but comprises a metal reflector and multiple periods of dielectric spacer and metal absorber layers. The proposed R-D-A-D structures produce highly effective peak suppression effects but require fewer layers. This benefits the fabrication process and lowers the cost of production.

The structure of the pigment is such that the a colour shift occurs as the relative viewing angle is varied. If the object to which the coating is applied is tilted in front of the observer, or the observer tilts their head, the coating therefore appears to change colour. By using a dielectric material with a low refractive index, such as $MgF_2$, the structure gives a stronger colour shift with angle. This may be used for decorative effect or may be used as an anticounterfeiting measure, to provide means for identifying a genuine article. If an equivalent colour effect is required using a physically thinner dielectric layers, with minimal angle tuning effect, a higher refractive index dielectric material such as titanium oxide ($TiO_2$) can be used to minimise sensitivity to viewing angle.

The coatings may be in the form of a continuous film, where the metal and dielectric layers are deposited on a substrate, such as plastic, which can then be applied to an article or a label. Alternatively, the pigment may be produced in flake form for subsequent incorporation into paints, inks, polymer binder or moulded articles. Flakes can be prepared by depositing layers of metal and dielectric onto a disposable substrate, such as plastic sheet or continuous plastic roll, using conventional vacuum based deposition techniques such as sputtering, thermal or electron beam evaporation or activated chemical vapour deposition (CVD).

Figure 5B:
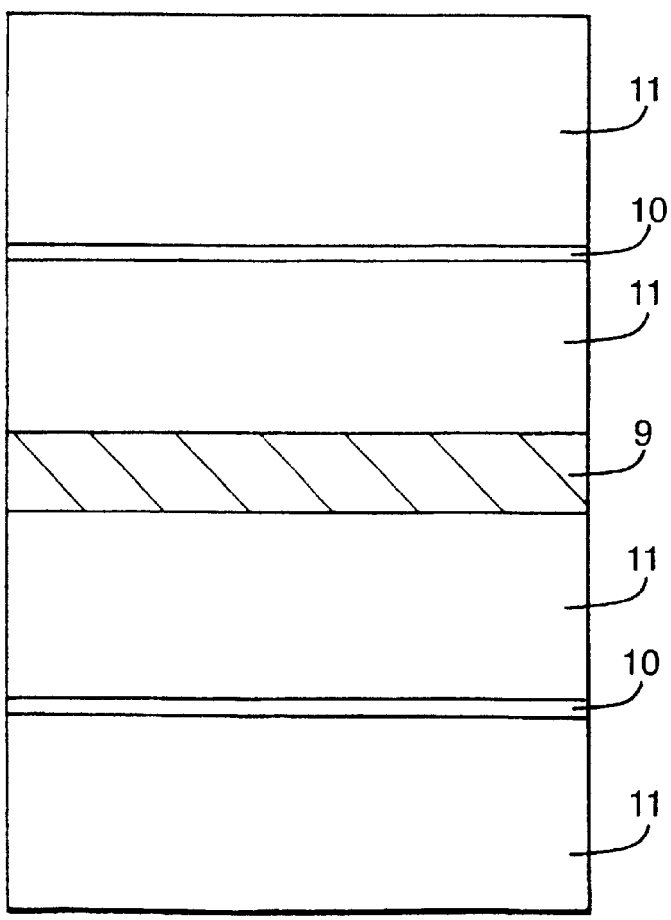
FIG. 5b shows a symmetric reflector-dielectric-absorber-dielectric structure, based around a central reflecting layer (D-A-D-R-D-A-D)

Preferably, in flake form, the structure deposited is symmetrical about a central reflective layer so that flakes have the same appearance regardless of their orientation. For example, the coating may be of the form D-A-D-R-D-A-D, as shown in FIG. 5b. An alternative way of forming the flake is to take pre-existing flake substance, such as mineral or mica flakes, and deposit on a disposable substrate using, for example, known fluidised bed chemical vapour deposition, vacuum evaporation or sputtering techniques. Particulate substrates on which the layers are deposited may be reflecting, in which case the particulate substrate forms the reflective layer. Alternatively, a reflective layer may be deposited on a non-reflecting particulate substrate.

A spherical substrate may be used, such as a ceramic microsphere, and the reflector, dielectric and absorber materials are layered onto the sphere using, for example, fluidised bed chemical vapour deposition, vacuum evaporation or sputtering techniques.

In a structure having the general form of reflector-dielectric-absorber-dielectric (R-D-A-D), the choice of material for use of the absorbing layer is restricted to those which have a n/k ratio of approximately 1, where n is the refractive index of the material and k is the optical constant. The only metals currently known to meet this criterion are 'grey' metals, including chrome (Cr), vanadium (V), nickel (Ni), palladium (Pd) or platinum (Pt).

Figure 11:
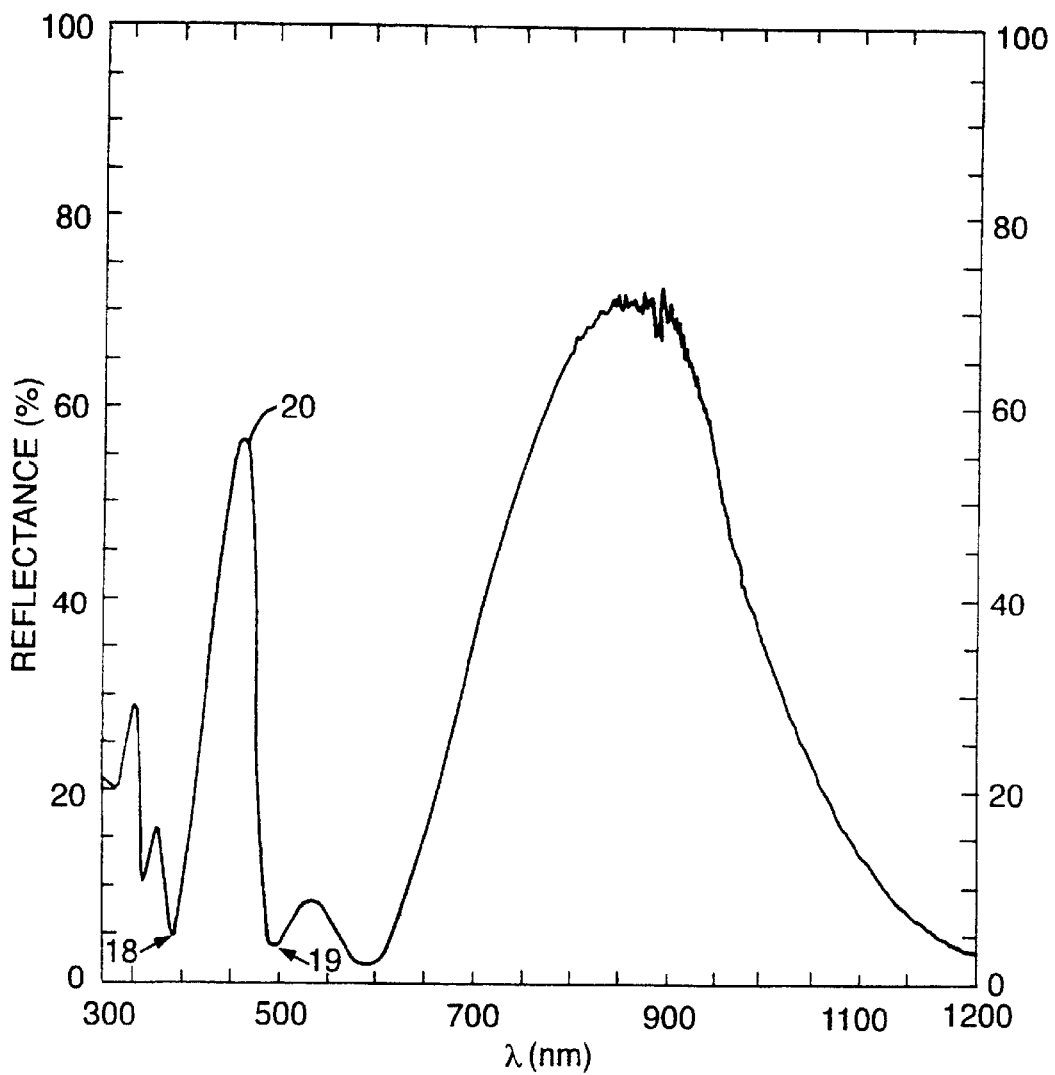
FIG. 11 shows the reflectance spectrum of an R-D-A-D with a reflector-dielectric-substoichiometric metal oxide-dielectric structure.

FIG. 11 shows the reflectance spectrum of a R-D-A-D structure in which the absorber layer is a substoichiometric metal oxide (SMO) material. In this example, the reflective layer is aluminium, the dielectric layers are $TiO_2$ (thickness of each layer=165 nm) and the metal oxide layer is $TiO_x$ (thickness=40 nm). In the visible wavelength region in particular, the values of the n/k ratio for $TiO_x$ are sufficient for the material to be used as an effective absorber layer in such a structure. The $TiO_x$ absorber layer suppresses propagation of odd multiples of half waves, resulting in the suppression of every other peak in the spectrum (corresponding to the minima at 370 nm (18) and 530 nm (19)). The reflectance peaks in the spectrum 20 gives the structure a strong purple colour.

In the example shown, a reflectance maximum 20 occurs at approximately 440 nm, the short wavelength end of the visible spectrum. In such a device, the thickness of the dielectric layers determines the position at which reflection minima and maxima occur. Typically, the dielectric layers may have a thickness, x, of between 10 nm and 800 nm. The metal oxide absorber layer is typically between 10–60 nm, depending on the exact value of the optical loss, k, and refractive index, n, of the dielectric material. By varying the materials and thickness of the layer structure, the wavelengths at which the reflectance peaks occur can therefore be shifted, not only within the visible spectrum, but also into the ultra violet or near infrared wavelength regions.

Further layers of dielectric material and substoichiometric metal oxide may be included in the structures to give varying reflectance characteristics (e.g. R-D-SMO-D-SMO or R-D-SMO-D-SMO-D), although increasing the number of layers increases the complexity of the fabrication process.

One advantage of using a substoichiometric metal oxide rather than a metal absorbing layer is in terms of the fabrication process as only one deposition technique and apparatus is required to fabricate the dielectric and absorber layers. In conventional M'-D-M structures, in which the absorber layer is a metal, separate deposition sources are necessary to prepare the dielectric and metal absorber layers.

Many deposition techniques that can produce thin film oxides require the input of additional oxygen to produce materials in the maximum valence states. Reactive sputtering using a titanium metal target and argon/oxygen ($Ar/O_2$) plasma can produce stoichiometric transparent $TiO_2$. Reducing the amount of oxygen injected into the plasma results in the deposition of substoichiometric material. Using this technique, the switch between layers of $TiO_2$ and $TiO_x$ can be readily achieved by simply modulating the oxygen flow.

It is possible that other techniques, such as electron beam deposition, may also be able to rely on supplies of additional oxygen to counter the loss of oxygen from solid source materials which may themselves be substoichiometric $TiO_x$. Conventional electron beam deposition techniques may therefore be adapted to switch between the production of $TiO_x/TiO_2$ layers.

Conventional chemical vapour deposition (CVD) using thermal decomposition of titanium isopropoxide $Ti(OC_3H_7)_4$ results in the deposition of semi opaque $TiO_x$, although material produced using the method does not have a high enough value of k to act as an absorber in the manner described. Deposition in a reducing atmosphere, such as a $Ar/H_2$ or $CO/CO_2$ mix, however, may remove enough oxygen to produce material with the desired optical properties.

The coating of individual particles with oxide/suboxide layers may also be used to prepare such structures using fluidised bed techniques. The fluidised bed approach utilises conventional CVD techniques and enables the coating of suitable substrate particles, for example metal or metal coated flake or microspheres, with the oxide and sub-oxide layers. The technique of coating individual particles using such a technique would be conventional to one skilled in the art.

Figure 12:
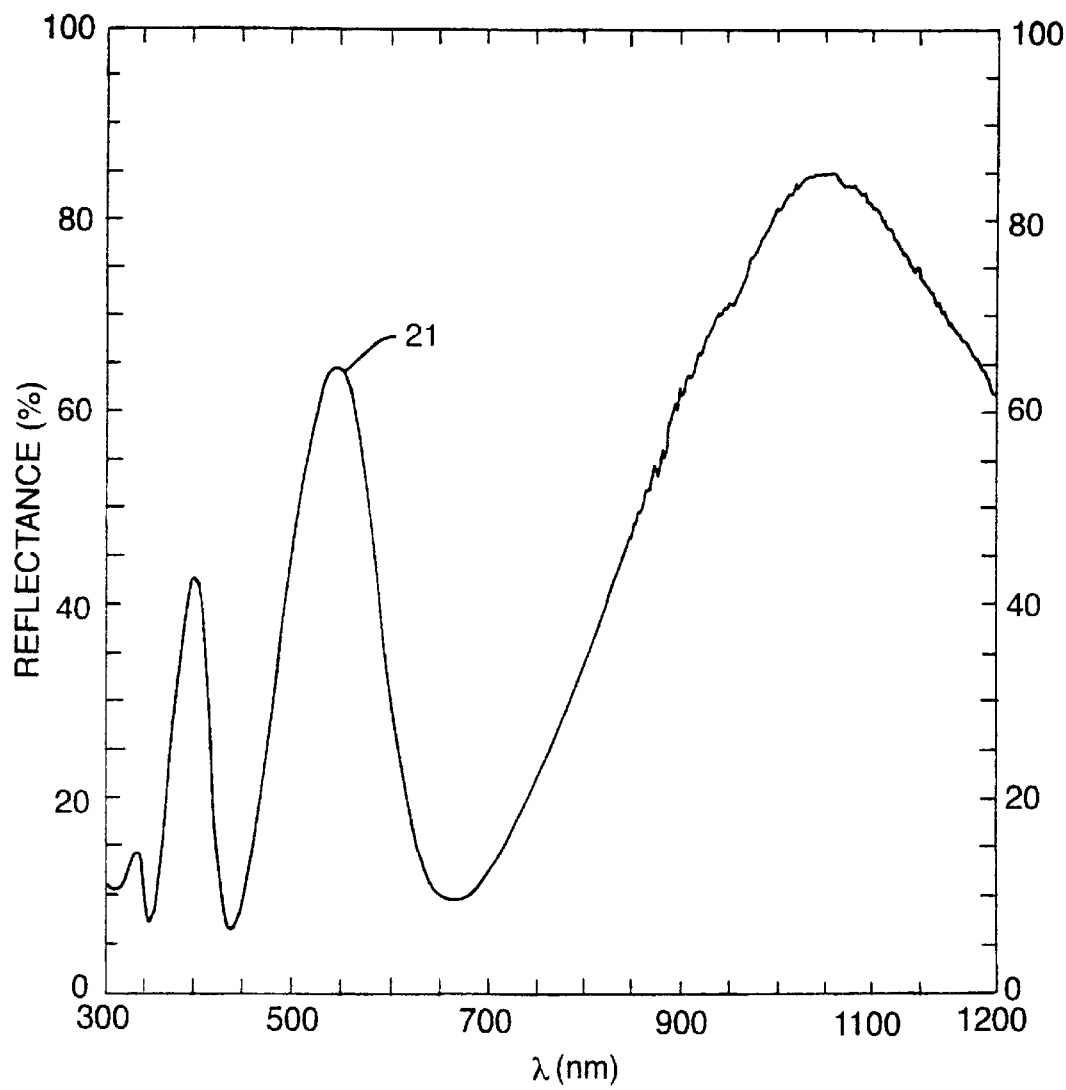
FIG. 12 shows the reflectance spectrum of a reflector-dielectric-substoichiometric metal oxide structure.

A coating having a structure of the form reflector-dielectric-substoichiometric metal oxide is therefore more easily fabricated than a conventional M'-D-M structure. FIG. 12 shows the reflectance spectrum of a reflector-dielectric-substoichiometric metal oxide structure wherein the metal absorbing layer used in a conventional M'-D-M is replaced with a substoichiometric metal oxide material. In this example the dielectric layer is $TiO_2$, having a thickness of 220 nm, and the metal oxide layer is $TiO_x$, having a thickness of 20 nm. As in the previous example, any metal oxide which can be produced in substoichiometric form and has suitable optical constants may be used as the absorbing layer.

Referring to FIG. 12, the presence of the substoichiometric (or metal rich) metal oxide absorbing layer suppresses propagation of modes consisting of odd multiples of quarter waves and increases the reflection contrast. In the absence of the metal oxide absorber, the reflectance at the minima would be considerably higher. In this example, the maximum in the reflectance spectrum 21 gives rise to a strong blue/green colour.

According to another aspect of the invention, conducting oxide materials may be used as the absorbing layer with the intention of producing strong reflectance features in the infrared wavelength region. In particular, coatings exhibiting reflectance contrast in the infrared have covert marking and anticounterfeiting applications, where hidden features can be used to identify an article or a product. Although this requirement can be met with dielectric coatings, these have to be fairly complex to produce the required spectral profile. Using the present invention, the same effect can be achieved with a three or four layer structure, such as a reflector-dielectric-conducting metal oxide-dielectric structure.

The use of 'grey' metals, such as chrome and vanadium, as the absorbing layer in an interference structure does not produce coatings that work sufficiently well in the infrared wavelength region. These materials exhibit typical metallic behaviour in that the optical loss, k, increases rapidly in the infrared, taking the n/k ratio well away from the optimum ratio for such devices of 1.

Whereas grey metals tend to have n/k as unity in the visible wavelength band, conducting oxides tend to reach this condition in the infrared, some having very low values of k (high levels of transparency) in the visible region. The conducting oxides that are proposed for use as absorbing materials in the present invention may be classified as either active or non-active materials. Non-active refers to materials having fixed spectral properties under external stimulus, whereas active materials exhibit a dramatic change in spectral properties in response to an external stimulus, such as heat.

In the case of non-active coatings, the absorber layer may be fabricated using a conducting oxide film, for example ITO. ITO is transparent in the visible wavelength band, but has an increasing value of k in the infrared wavelength band, to the point where it will effectively act as an absorbing layer in this application.

Figure 13:
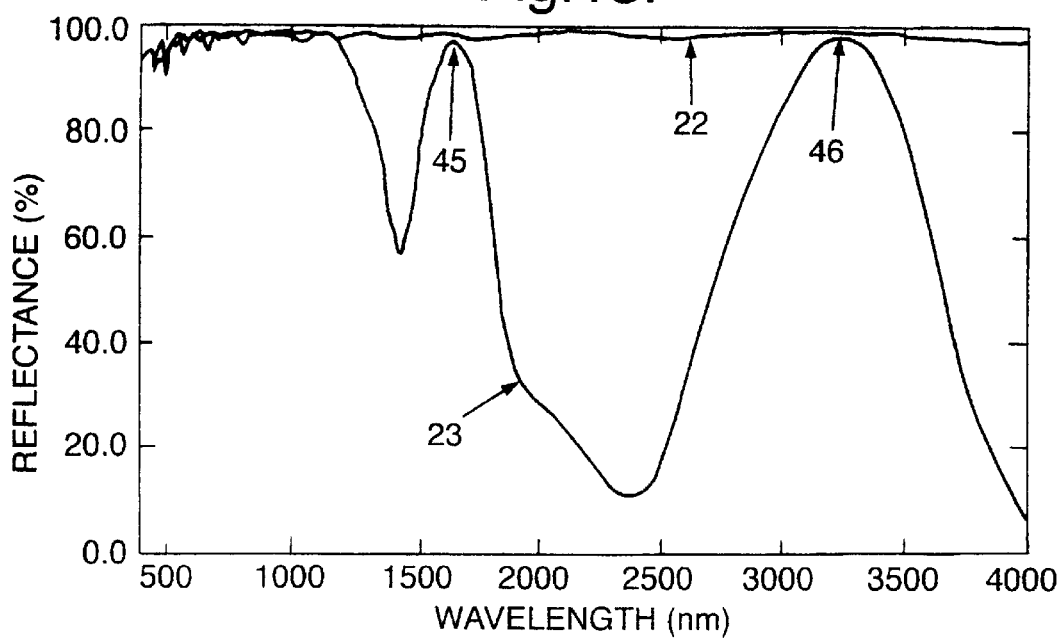
FIG. 13 shows the reflectance spectrum of a reflector-dielectric-conducting oxide-metal structure, incorporating a layer of indium tin oxide.

The reflectance spectrum of a reflector-dielectric-conducting oxide-dielectric coating is shown in FIG. 13. In this example the coating is of the form shown in FIG. 5a and the structure comprises a silver back reflector and an ITO layer (thickness=60 nm) sandwiched between two dielectric (MgF$_2$) layers, each 1100 nm thick. The choice of material for the back reflector is wide and is simply restricted to any material which will give good reflectivity over the range of interest. Suitable metal materials are gold, silver and aluminium. The requirement for the dielectric material is that it needs to be transparent over the range of interest. Suitable materials for use in multi layer interference structures for use in the infrared are magnesium fluoride (MgF$_2$), zinc sulphide (ZnS), zinc selenide (ZnSe), silicon (Si), germanium (Ge) and barium fluoride (BaF$_2$).

Referring to FIG. 13, curve 22 represents the reflectance when the ITO layer is absent (i.e. there is a single dielectric layer of 2200 nm) and curve 23 represents the reflectance when the ITO is present. In the absence of the ITO layer, the visible spectral region is relatively featureless and would appear to an observer to be an ordinary metallic coating (if the reflective layer were a metal). However, the ITO layer acts as an absorber and gives rise to reflection maxima and minima in the reflectance spectrum in the infrared wavelength region. Other conducting oxides with appropriate values of k, for example doped tin oxide (e.g. SnO$_2$:F), may also be used to provide the required absorption in this region. The number and positions of the reflectance peaks can be varied by choosing different dielectric materials of varying thickness.

Non oxide conducting materials, such as titanium nitride (TiN) and iron sulphide (FeS$_2$) and metal silicides such as titanium silicide (TiSi), tantalum sulicide (TaSi) and tungsten silicide (WSi), may have appropriate characteristics to be used as the absorber layer. Conducting oxides, nitrides, suicides and sulphides when deposited in sufficient thicknesses, can exhibit high reflectances in the infrared wavelength region, whilst, in the case of conducting oxides, maintaining high transparency in the visible waveband. The materials may therefore also be used to form the reflective layer in the structures. Although the reflectance levels are somewhat lower than for metals, for certain applications the reflectance may be sufficient. For example, as conducting oxides are transparent in the visible region, it may be beneficial to use them in covert product marking applications. Furthermore, only two materials are then needed in total to fabricate the coating; the conducting oxide, silicide or nitride material and the dielectric.

A layer of conducting oxide may also be used as the absorber layer (and/or as the reflective layer, as discussed previously) in a structure comprising a single layer of dielectric material (a reflector-dielectric-conducting oxide structure) to give strong reflectance characteristics in the infrared region.

A layer of VO$_2$ may also be used as the absorber layer in the multi layer interference structures. VO$_2$ undergoes a reversible phase change from a semiconducting to a metallic state at 68° C., in the case of undoped stoichiometric material. In terms of optical properties, the phase change manifests itself primarily in a large increase in k in the infrared wavelength region. For a layer of sufficient thickness (approximately 300 nm) an increase in infrared reflection occurs with the onset of metallic behaviour. When the phase change occurs, the n/k ratio becomes very close to the n/k=1 ideal condition. VO$_2$ may therefore be used as an absorber in the structures described previously, to produce a structure having temperature dependent reflection characteristics.

At low temperatures, a multi layer structure comprising a VO$_2$ absorbing layer displays very little reflectance contrast in the infrared as the value of k is too low. Only a thin layer of VO$_2$ is required to produce the required active response the coating appears neutral in colour to the human eye, as the reflectance spectrum is relatively featureless in the visible wavelength region, and has the appearance of a typical metal coating (if a metal reflector is used). On heating the structure, no effect is observed in the visible region and the operation of the coating is therefore covert. In the infrared wavelength region, the effect would be the sudden appearance of reflectance contrast as the now absorbing VO$_2$ layer suppresses the propagation of certain multiples of quarter or half waves.

Figure 14A:
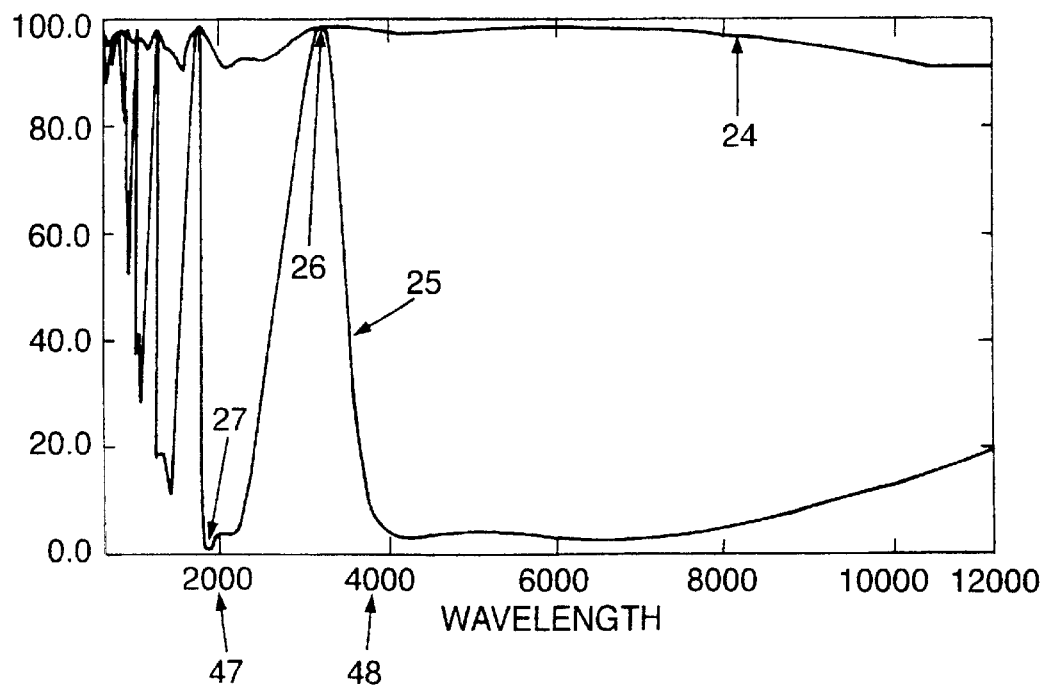
FIG. 14a shows the reflectance spectrum of a reflector-dielectric-conducting oxide-metal structure incorporating a layer of vanadium oxide ($VO_2$)

The effect is illustrated in FIG. 14a which shows the reflectance spectrum in the infrared wavelength region for an active reflector-dielectric-VO$_2$-dielectric structure. In this example, the reflective layer is silver, the dielectric layers are MgF$_2$ (each layer 1100 nm in thickness) and the VO$_2$ layer approximately 30 nm thick. Curves 24 and 25 represent the reflectance of the structure below and above respectively the transition temperature of VO$_2$. This illustrates that, upon heating the structure, a very high (>90%) reflectance contrast can be achieved between a maximum 26 and minimum 27 in the reflectance curve 25.

In order to achieve such a high reflectance contrast with a single layer of VO$_2$, a thickness of approximately 300 nm is required. By incorporating a VO$_2$ layer into a multi layer reflector-dielectric-VO$_2$-dielectric structure, a high reflectance contrast is achieved using a single VO$_2$ layer of only 30 nm thickness. As the VO$_2$ layer is the major cost factor, the reduction in thickness outweighs the cost of the extra dielectric layers.

Furthermore, VO$_2$ has a distinct brown appearance when deposited in a substantial thickness. However, the appearance of an ordinary metallic coating could be presented with the very thin layers necessary in these devices preserving the appearance of the underlying metal reflector (for example, silver or aluminium). Such a coating would therefore be suitable as an anticounterfeiting measure and may be used, for example, to form features like the metallic thread in bank notes without deviating from the inconspicuous metal appearance. If a visibly dark coating were required, a material such as diamond like carbon may be used as the dielectric to hide the presence of the metal underlayer in the visible wavelength region.

Figure 14B:
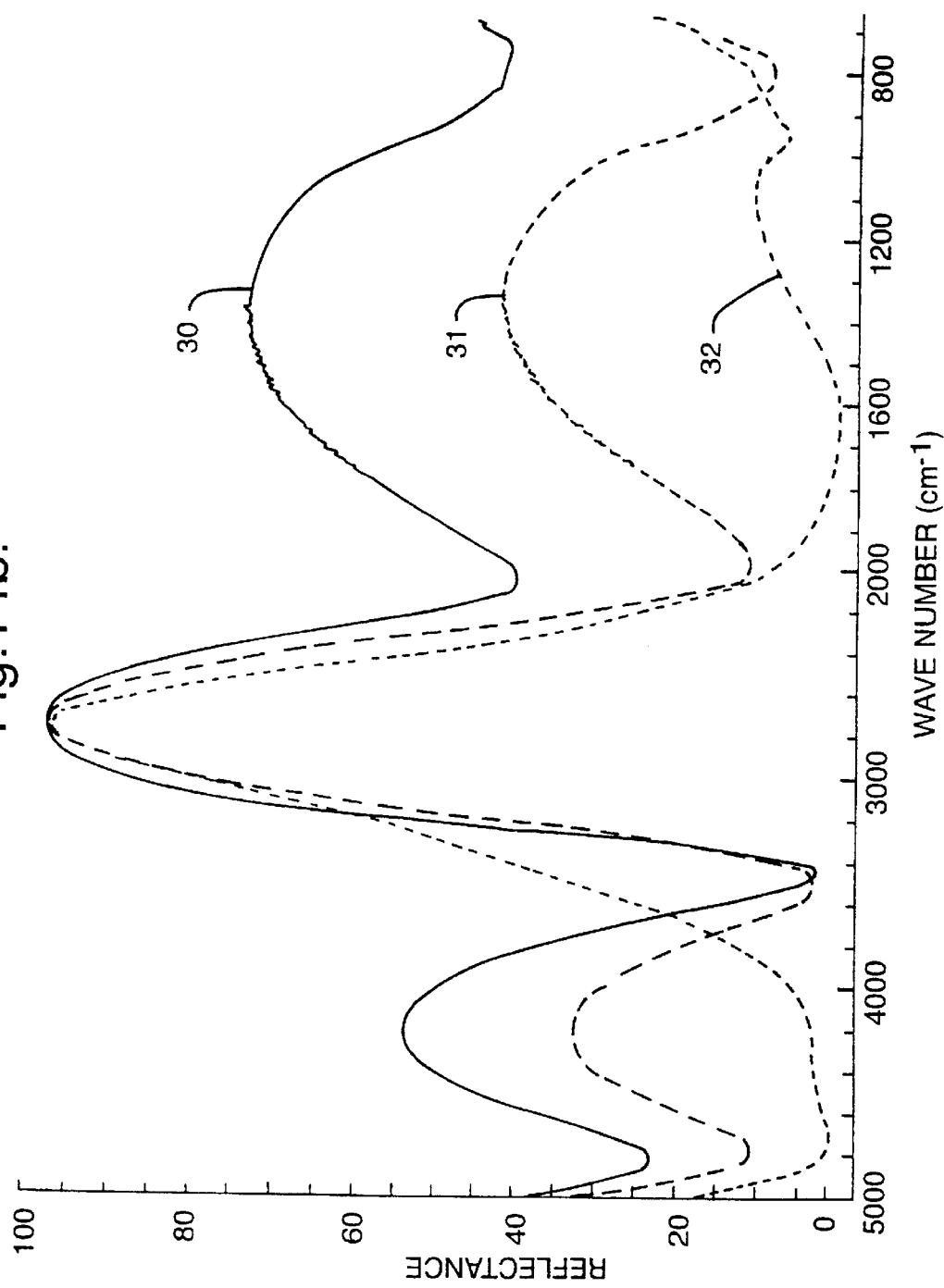
FIG. 14b shows the reflectance spectrum of a reflector-dielectric-conducting oxide-metal structure incorporating a layer of substoichiometric vanadium oxide ($VO_{2-x}$) and FIG. 15 shows a system incorporating the coating of the present invention which may be used to verify the authenticity of an article.

It is known that VO$_2$ may be doped with a transition metal, such as tungsten and molybdenum. By using a doped VO$_2$ absorber layer a continuously varying transition with temperature may be achieved, therefore giving a "greyscale" effect. This may also be achieved using an absorbing layer of substoichiometric (metal rich) VO$_2$ (VO$_{2-x}$). FIG. 14b shows the reflectance spectrum of a reflector-dielectric-VO$_{2-x}$-dielectric structure for three different temperatures, with curves 30,31,32 representing the reflectance at three different increasing temperatures respectively. As the temperature is increased, the reflectance increases in a continuous way, rather than the abrupt transition illustrated in FIG. 14a. Thus, a continuous variation in reflectance is obtained as the temperature of the structure is increased.

Reflector-dielectric-VO$_2$ structures may also be used to provide active coatings having high reflectance contrast in the infrared wavelength region, wherein the coating is activated by heating to a temperature greater than the transition temperature of VO$_2$.

Figure 15:
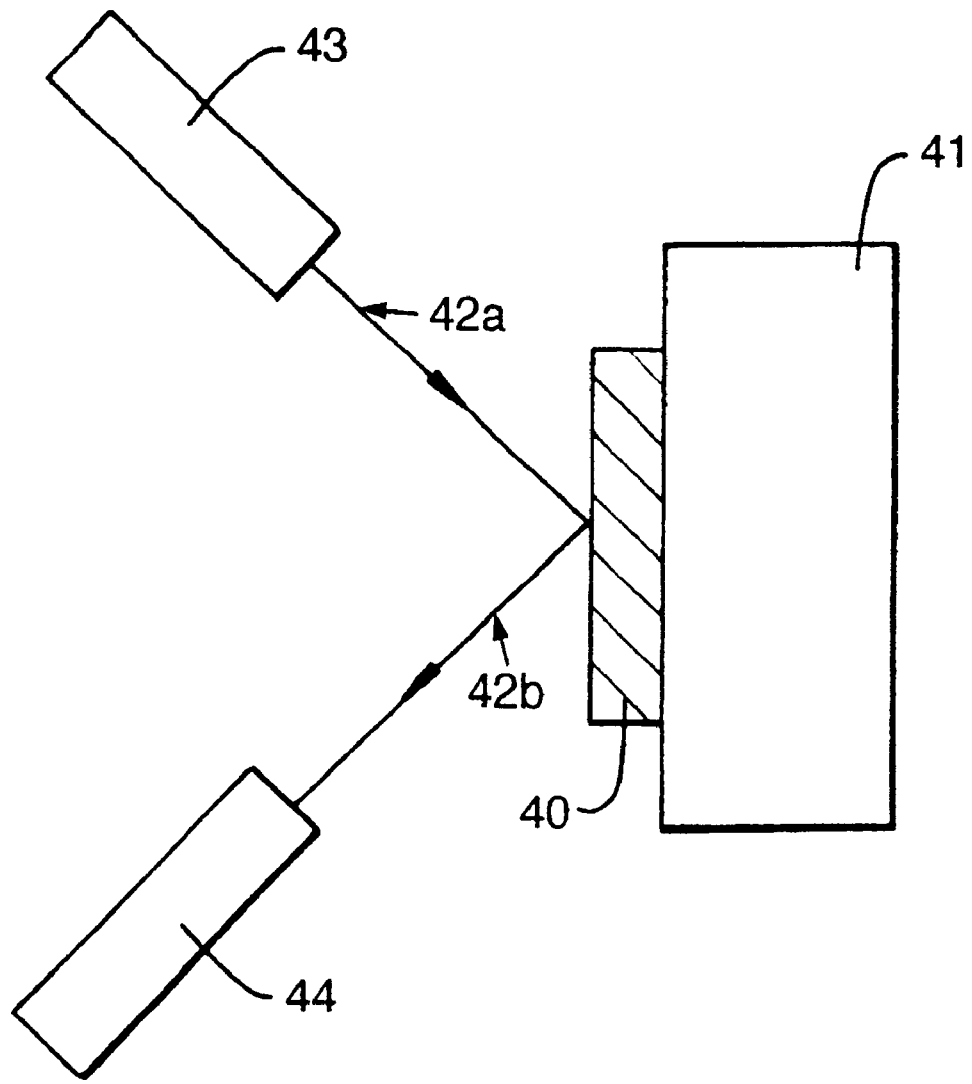

In order to incorporate the coatings in an anticounterfeiting system, suitable illumination and detection means are required. FIG. 15 shows a diagram of the apparatus which may be used to verify the authenticity of a product or article to which the coating is applied. This apparatus may be used in conjunction with a coating having the form of any of the structures to which the patent application relates, although in practice coatings with strong reflectance characteristics in the visible region it may be preferable to identify the coating simply by the observation of a change in colour upon tilting the angle relative viewing angle.

For example, referring to FIG. 15, the coating 40 is applied to an article 41 to be identified. The article is then illuminated with radiation 42a from a source 43 and radiation 42b reflected from the coating 40 is detected by suitable detection means 44. Referring to the example coating shown in FIG. 13, if the coating 40 is illuminated with radiation 42a having a wavelength substantially corresponding to a reflection maximum (45 or 46), the detection of reflected infrared radiation could be used to provide an indication of the authenticity of the article 41. The detection means should be sensitive to a wavelength region comprising the wavelength of the illuminating radiation. In addition, an actual measure of the intensity of reflected radiation 42b may be required to authenticate the article.

In an alternative embodiment the system may be used to verify the authenticity of an article by illuminating the product to which the coating is applied with radiation of two discrete wavelengths, one coincident with a reflection maximum and one coincident with a reflection minimum. This may be of particular use for a system in which an active coating is incorporated. For example, referring to FIG. 14, before the structure is heated the intensity of radiation reflected at the two wavelengths 47 and 48 will be similar. After the structure is heated, the reflected radiation at the two wavelengths will be considerably different. The difference between the reflectance at the two wavelengths would provide a more accurate measurement than a measurement at a single wavelength. Although it may be preferable to measure the reflectance at wavelengths corresponding to a maximum and minimum in the reflectance spectrum, in principle any two wavelengths may be chosen for which there is a difference in the reflectance before and after the structure is heated.

A suitable source of radiation 43 for use in the apparatus may be a $CO_2$ laser, an infrared HeNe laser or a solid state diode laser. In the case of active coatings, the radiation source may also provide the heating necessary to activate the coating.

In the case of active reflector-dielectric-$VO_2$-dielectric coatings, including reflector-dielectric-$VO_{2-x}$-dielectric coatings and coatings comprising a doped $VO_2$ absorbing layer, as shown in FIGS. 14a and 14b, a source of heat needs to be incorporated in the apparatus. A conventional spectrophotometer with a heating attachment may be used to provide both the means for heating the coating and for detecting reflected radiation in a single unit. An infrared imager which could visually display the contrast change may also be used to detect radiation reflected from the coating.

Conventionally, the infrared wavelength region is taken to mean wavelengths between 700 nm and 1000 $\mu$m. For the purpose of this specification the infrared wavelength region of interest is between 700 nm and 15 $\mu$m, and preferably between 700 nm and 12 $\mu$m.

What is claimed is:

1. A multi layer interference device having a reflectance spectrum comprising at least one maximum comprising;

at least one multilayer stack, a reflective layer having at least one surface for carrying said at least one multi layer stack, said at least one multi layer stack comprises a first layer of dielectric material, a layer of absorbing material and a second layer of dielectric material arranged in series with the layer of absorbing material situated between the first and second layers of dielectric material, wherein the second layer of dielectric material has substantially the same optical thickness as the first layer of dielectric material at a wavelength substantially corresponding to a maximum in the reflectance spectrum and wherein the layer of absorbing material has a refractive index n and an optical constant k, such that incident electromagnetic radiation, having a wavelength at which odd multiples of half wavelengths substantially correspond to the optical thickness of the at least one multi layer stack at said wavelength, is substantially absorbed within the device, wherein the layer of absorbing material is a conductive substoichiometric metal oxide and in that the device has a reflectance spectrum in the infrared wavelength region.

2. The device of claim 1 wherein the first dielectric material is the same as the second dielectric material.

3. The device of claim 1 wherein at least one of the first or second dielectric materials is any one of titanium oxide ($TiO_2$), magnesium fluoride ($MgF_2$), zinc sulphide (ZnS), zinc selenide (ZnSe), silicon (Si), germanium (Ge) or barium fluoride ($BaF_2$).

4. The device of claim 3 wherein the n/k ratio of the absorbing material is between 0.7 and 1.3 in the infrared wavelength region.

5. The device of claim 4 wherein the n/k ratio of the absorbing material is substantially equal to 1 in the infrared wavelength region.

6. The device of claim 5 wherein the reflective layer is a metal.

7. The device of claim 5 wherein the reflective layer is any one of a conducting oxide, a conducting nitride, a conducting silicide or a conducting sulphide.

8. The device of claim 1 wherein the substoichiometric metal oxide absorbing material is of the same material as the layer of dielectric material.

9. The device of claim 8 wherein the substoichiometric metal oxide is $TiO_x$ and the dielectric material is $TiO_2$.

10. The device of claim 1 wherein the reflective layer has two opposite facing surfaces wherein at least one multi layer stack is deposited on each of the two opposite facing surfaces such that the device has a substantially symmetric structure about the reflective layer.

11. The device of claim 1 wherein the device is in the form of a thin film.

12. The device of claim 11 wherein the thin film is flaked into fragments.

13. A moulded article incorporating the fragments of thin film of the device according to claim 12.

14. A paint or ink incorporating the fragments of thin film of the device according to claim 12.

15. An article, wherein said paint or ink of the device according to claim 14 is applied to the surface of said article.

16. An article having a label, said label having said paint or ink of the device according to claim 14 applied thereto.

17. The device of claim 1 wherein the reflective layer is a reflecting particulate substrate.

18. The device of claim 17 wherein the particulate substrate is substantially spherical.

19. The device of claim 1 wherein the reflective layer is deposited on a substantially non-reflecting particulate substrate.

20. A system for marking an article and checking its authenticity comprising;
   the device of claim 1 wherein the device is applied to the article to be authenticated,
   an illuminator for illuminating the device with incident radiation comprising one or more wavelengths wherein one or more of the wavelengths substantially correspond to a maximum or a minimum in the reflectance spectrum of the device and
   a detector for detecting radiation reflected from the device at one or more of the wavelengths,
   whereby the detection of the reflected radiation provides an indication of the authenticity of the article.

21. The system of claim 20, whereby a comparison of the reflected radiation at two or more wavelengths provides an indication of the authenticity of the article.

22. The system of claim 20 wherein the detector for detecting infrared radiation reflected from the device is a thermal imager.

23. The system of claim 20 wherein the detector for detecting infrared radiation reflected from the device is a spectrophotometer.

24. A multi layer interference device, having a reflectance spectrum in the infrared wavelength region comprising at least one maximum, comprising;
   at least one multilayer stack,
   a reflective layer having at least one surface for carrying said at least one multi layer stack,
   wherein said at least one multi layer stack comprises a first layer of dielectric material, a layer of absorbing material and a second layer of dielectric material arranged in series with the layer of absorbing material situated between the first and second layers of dielectric material,
   wherein the second layer of dielectric material has substantially the same optical thickness as the first layer of dielectric material at a wavelength substantially corresponding to a maximum in the reflectance spectrum and wherein the layer of absorbing material has a refractive index n and an optical constant k, such that incident electromagnetic radiation, having a wavelength at which odd multiples of half wavelengths substantially correspond to the optical thickness of said at least one multi layer stack at said wavelength, is substantially absorbed within the device and wherein the layer of absorbing material is any one of a conducting oxide, a conducting nitride, a conducting silicide or a conducting sulphide for which the n/k ratio is substantially equal to 1 in the infrared wavelength region.

25. The device of claim 24 wherein the reflective layer is a metal.

26. The device of claim 24 wherein the reflective layer is any one of a conducting oxide, a conducting nitride, a conducting silicide or a conducting sulphide.

27. The device of claim 24 wherein the absorbing material is substantially the same material as the reflective layer.

28. The device of claim 24 wherein the absorbing material is any one of indium tin oxide (ITO), doped tin oxide or titanium nitride (TiN).

29. The device of claim 24 wherein the layer of absorbing material is vanadium dioxide ($VO_2$) and the reflectance spectrum of the device may be varied with temperature.

30. A system for covertly marking an article and checking its authenticity comprising;
   the device of claim 29, wherein the device is applied to the article to be authenticated;
   a temperature control for varying the temperature of the device such that the reflectance of the device at one or more wavelengths may be varied as the temperature is varied;
   an illuminator for illuminating the device with infrared radiation comprising one or more wavelengths substantially corresponding to one or more of the wavelengths at which the reflectance varies and
   a detector for detecting infrared radiation reflected from the device at one or more wavelengths at which the reflectance varies,
   whereby a comparison of the reflected radiation before and after the temperature of the device is varied provides an indication of the authenticity of the article.

31. The system of claim 30 wherein the means for illuminating the device and the temperature control is a single laser.

32. The device of claim 24 wherein the absorbing material is substoichiometric vanadium dioxide ($VO_{2-x}$) and the reflectance spectrum of the device may be varied with temperature.

33. The device of claim 24 wherein the absorbing material is doped vanadium dioxide and the reflectance spectrum of the device may be varied with temperature.

34. A multi layer interference device, having a reflectance spectrum in the infrared wavelength region comprising at least one maximum, comprising:
   at least one multilayer stack,
   a reflective layer having at least one surface for carrying said at least one multi layer stack,
   said at least one multi layer stack comprises a layer of dielectric material and a layer of absorbing material, wherein the layer of absorbing material has a refractive index n and an optical constant k, such that incident electromagnetic radiation, having a wavelength at which odd multiples of quarter wavelengths substantially correspond to the optical thickness of said at least one multi layer stack at said wavelength, is substantially absorbed within the device,
   wherein the layer of absorbing material is a non-metal absorbing material.

35. The device of claim 34 wherein the reflective layer is a metal.

36. The device of claim 34 wherein the reflective layer is any one of a conducting oxide, a conducting nitride, a conducting silicide or a conducting sulphide.

37. The device of claim 34 wherein the layer of non-metal absorbing material is any one of a conducting oxide, a conducting nitride or a conducting silicide for which the n/k ratio is substantially equal to 1 in the infrared wavelength region.

38. The device of claim 37 wherein the non-metal absorbing material is any one of ITO, doped tin oxide or TiN.

39. The device of claim 37 wherein the non-metal absorbing material is vanadium oxide ($VO_2$) and wherein the reflectance spectrum may be varied with temperature.

40. The device of claim 37 wherein the non-metal absorbing material is substoichiometric vanadium oxide ($VO_2$) and wherein the reflectance spectrum may be varied with temperature.

41. The device of claim 37 wherein the non-metal absorbing material is doped vanadium oxide and wherein the reflectance spectrum may be varied with temperature.

42. The device of claim 37 wherein the non-metal absorbing material is a substoichiometric metal oxide.

43. The device of claim 42 wherein the substoichiometric metal oxide is $TiO_x$.

44. A multi layer interference device, having a reflectance spectrum in the visible wavelength region comprising at least one maximum, comprising;

at least one multilayer stack, a reflective layer having at least one surface for carrying said at least one multi layer stack, said at least one multi layer stack comprises a layer of dielectric material and a layer of absorbing material, such that incident electromagnetic radiation, having a wavelength at which odd multiples of quarter wavelengths substantially correspond to the optical thickness of said at least one multi layer stack at said wavelength, is substantially absorbed within the device, wherein the absorbing material is a conducting substoichiometric metal oxide.

* * * * *